United States Patent
Do et al.

(10) Patent No.: US 6,502,746 B1
(45) Date of Patent: Jan. 7, 2003

(54) DEVICE, METHOD, AND SYSTEM FOR EXTRACTING DEPOSITED ITEMS FROM AN ATM/CAT SAFE

(75) Inventors: Cuong D. Do, Reseda, CA (US); Edward M. R. Dudasik, West Hills, CA (US); Michael L. Sears, Torrance, CA (US); Xuan S. Bui, Culver City, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/377,510

(22) Filed: Aug. 19, 1999

Related U.S. Application Data

(60) Provisional application No. 60/099,060, filed on Sep. 2, 1998, and provisional application No. 60/106,201, filed on Oct. 30, 1998.

(51) Int. Cl.[7] .............................................. G06F 17/60
(52) U.S. Cl. ...................... 235/379; 235/380; 235/381; 235/382; 235/375; 705/43
(58) Field of Search .............................. 235/379, 382, 235/381, 380, 375; 902/8, 9, 13, 14, 16, 17; 705/43

(56) References Cited

U.S. PATENT DOCUMENTS

| | | | | |
|---|---|---|---|---|
| 4,134,537 A | * | 1/1979 | Glaser et al. ................ 235/379 |
| 4,166,945 A | * | 9/1979 | Inoyama et al. ............ 235/379 |
| 4,612,864 A | | 9/1986 | Beck et al. ................. 109/49.5 |
| 4,754,126 A | * | 6/1988 | Caldwell ..................... 235/379 |
| 5,286,954 A | * | 2/1994 | Sato et al. ................... 235/379 |
| 5,488,660 A | | 1/1996 | Dawson et al. .............. 380/24 |
| 5,561,281 A | * | 10/1996 | Eda et al. .................... 235/379 |
| 5,629,981 A | * | 5/1997 | Nerlikar ....................... 380/25 |
| 5,711,231 A | | 1/1998 | Couvrette et al. ............ 109/2 |
| 5,788,348 A | * | 8/1998 | Ramachandran et al. ... 312/223 |
| 5,984,177 A | | 11/1999 | Do et al. ..................... 235/379 |
| 6,119,622 A | * | 9/2000 | Banerjea ..................... 116/202 |
| 6,170,818 B1 | * | 1/2001 | Eastman et al. .............. 902/14 |
| 6,206,284 B1 | * | 3/2001 | Do et al. ..................... 235/379 |
| 6,302,393 B1 | * | 10/2001 | Beskitt et al. ............... 271/385 |
| 6,315,194 B1 | * | 11/2001 | Graef et al. ................. 235/379 |

FOREIGN PATENT DOCUMENTS

WO          01/22314    *   3/2001

OTHER PUBLICATIONS

International Preliminary Examination Report on International Patent Application No. PCT/US99/19844, dated Dec. 19, 2000 (mailing date).
Written Opinion, Issued by the Patent Cooperation Treaty, International Preliminary Examining Authority, for International Application No. PCT/US99/19844, International Filing Date, Aug. 27, 1999, Date of Mailing, Jul. 21, 2000.

* cited by examiner

Primary Examiner—Thien M. Le
Assistant Examiner—Uyen-Chau Le
(74) Attorney, Agent, or Firm—George T. Marcou; Kilpatrick Stockton LLP

(57) ABSTRACT

A device, system and method for extracting deposited items from a secure enclosure, such as the envelope bin of an ATM/CAT safe, makes use, for example, of computer hardware and software applications, as well as one or more secure access devices, card devices, transponder devices, input devices, control mechanisms, transport bins, and transport devices, to modify or field retrofit an existing ATM/CAT to enable removal of items without opening the safe door. The modified ATM/CAT enables a service person, for example, to enter a retrieval request, which is received by a control device, and the control device automatically opens an access port of shutter of the ATM/CAT safe and automatically activates a transport mechanism to transport items out of the safe to be received by the service person or a secured access bin docked, for example, with the access port.

56 Claims, 8 Drawing Sheets

DEPOSITED ENVELOPE RETRIEVAL WITH SECURED TRANSFER BIN

DEPOSITED ENVELOPE RETRIEVAL WITH SECURED TRANSFER BIN

DEPOSITED ENVELOPE RETRIEVAL WITH SECURED TRANSFER BIN

DEVICE, METHOD, AND SYSTEM FOR EXTRACTING DEPOSITED ITEMS FROM AN ATM/CAT SAFE

CROSS REFERENCE TO RELATED APPLICATIONS

This application claims the benefit of U.S. Provisional Application No. 60/099,060 filed Sep. 2, 1998, and U.S. Provisional Application No. 60/106,201, filed Oct. 30, 1998.

FIELD OF THE INVENTION

The present invention relates generally to removal of valuable items from a secure enclosure, and more particularly to a device, method, and system for securely extracting and connectionless tracking of removal of deposited items from an automated teller machine/customer access terminal (ATM/CAT).

BACKGROUND OF THE INVENTION

The operation of an automated teller machine/customer access terminal (ATM/CAT) involves two primary service tasks, which are typically performed by service personnel, also referred to as couriers, contracted, for example, by a financial institution operating the ATM/CAT. A first primary service task is loading cash into the ATM/CAT for subsequent dispensing to customers. A second primary service task involved in the operation of an ATM/CAT is removing deposited items from the ATM/CAT that have been deposited into the ATM/CAT by customers.

Typically, a customer making a deposit at an ATM/CAT begins by placing the items to be deposited into an envelope. Generally, customer deposits consist of checks and/or paper currency, which are contained in this envelope. This envelope is usually supplied by the financial institution that operates the ATM/CAT. The deposited envelopes or items must be removed periodically from the ATM/CAT, particularly because they must be physically obtained in order to start the process of clearing the checks that are contained in the envelopes, or other deposited items, as soon as possible. Thus, it is typically required that a service person, with access to the inside of the secure safe of the ATM/CAT, obtain these deposited items daily.

Generally, the removal of customer deposited items from the ATM/CAT must be performed more frequently than the replenishment of cash into the ATM/CAT. For example, the customer deposited items may be removed daily or may be legally required to be removed, for example, every 24 hours, while the replenishment of cash to the ATM/CAT may be performed weekly. Thus, a service person must unlock and open the door of the ATM/CAT safe daily, in most cases, only to remove the customer deposited items.

ATMs/CATs typically store the cash that is to be dispensed to customers within cash cassettes inside a cash dispensing mechanism, all inside the secure safe of the ATM/CAT. Customer deposits are typically stored in a storage bin, which is part of a separate mechanism, inside the same safe. In order to access the storage area of the deposited items, a service person typically opens a door on the secure safe, and thus has physical access to both the deposited items in the storage bin, as well as the cash cassettes installed in the cash dispensing mechanism.

Currently, ATM/CAT enclosures typically include a secure safe that has a door which is equipped with a combination lock or other lock. The ATM/CAT also typically contains a mechanism which, under the control of a processor in the ATM/CAT, transports a customer's deposit from an entry slot in the front of the ATM/CAT to a storage bin inside the secure safe. Deposited items are transported into the storage bin, where they remain until a service person subsequently opens the safe door to retrieve the deposited items.

There are currently several elements of safety risks to service personnel, as well as a risk of financial loss to the financial institution, operating presently available ATMs/CATs. For example, the service person is exposed to some risk of possible attack in opening the safe door to retrieve deposited items. A potential thief who observes the service person open the safe door may take advantage of the opportunity to overtake the service person while the safe door is open and remove cash or customer deposited items from the safe or from the service person.

Further, the service person needs knowledge of the combination of the safe door lock to open the door. This knowledge puts the service person at risk of being taken hostage by someone attempting to unlawfully open the ATM/CAT safe door in order to remove items, such as cash or customer deposited items, from the safe. Additionally, a dishonest service person may be tempted to secretly remove and unlawfully misappropriate cash from the cash containers installed in the mechanism used for dispensing cash.

In addition, there is an expense associated with secure maintenance of combinations for safe door locks for multiple ATMs/CATs. Typically, the service person visits several locations where ATMs/CATs are located and, over the course of a day, removes the deposited items from each ATM/CAT. Thus, the service person must possess the combinations to many different ATMs/CATs. The secure maintenance of these combinations, by both the service person and the financial institution operating the ATMs/CATs, is a significant cost to the financial institution.

Thus, these service tasks associated with currently available ATMs/CATs, that require the physical opening of the ATM/CAT in order to perform the tasks, present serious risks of potential theft or other intrusion while the ATM/CAT is open, as well as serious safety risks to service persons in performing the tasks.

SUMMARY OF THE INVENTION

It is a feature and advantage of the present invention to provide a device, method, and system for securely and safely removing or transferring the contents of an ATM/CAT.

It is a further feature and advantage of the present invention to provide a device, method and system for securely removing or transferring the contents of an ATM/CAT utilizing, for example, a specially added slot for the ATM/CAT to facilitate removal of items from the ATM/CAT.

It is another feature and advantage of the present invention to provide a device, method and system for securely removing or transferring the contents of an ATM/CAT, which makes use, for example, of a deposit slot in both the ATM/CAT wall and the safe wall.

It is an additional feature and advantage of the present invention to provide a device, method and system for securely removing or transferring the contents of an ATM/CAT, which includes, for example, slots in the front of the ATM/CAT for front-loading ATMs/CATs and in the rear of the ATM/CAT for rear-loading ATMs/CATs.

It is a still further feature and advantage of the present invention to provide device, method and system for securely removing or transferring the contents of an ATM/CAT, which utilizes, for example, a specially adapted deposit slot for removal of items from the ATM/CAT via the ATM/CAT deposit slot.

It is another feature and advantage of the present invention to provide a device, method and system for securely removing or transferring the contents of an ATM/CAT, which makes use, for example, of a motorized transport belt located in the bottom of the ATM/CAT safe for transfer of the items from the safe.

It is an additional feature and advantage of the present invention to provide a device, method and system for securely removing or transferring the contents of an ATM/CAT, which utilizes, for example, a motor, sensors, and control electronics to activate the transport belt of the ATM/CAT.

It is a further feature and advantage of the present invention to provide a device, method and system for securely removing or transferring the contents of an ATM/CAT, which includes, for example, a secured transfer bin for receiving transferred items from the ATM/CAT.

It is an additional feature and advantage of the present invention to provide a device, method and system for securely removing or transferring the contents of an ATM/CAT, which makes use, for example, of a secured transfer bin that is dockable to the ATM/CAT.

It is still an additional feature and advantage of the present invention to provide a device, method and system for securely removing or transferring the contents of an ATM/CAT, which enables secure access and control of the ATM/CAT for the service person during contents transfer and removal of contents of the ATM/CAT.

It is another feature and advantage of the present invention to provide a device, method and system of securely removing or transferring the contents of an ATM/CAT, utilizing, for example, an access card and personal identification number (PIN) for the service person to assure secure access and control of the ATM/CAT during transfer and removal of contents.

It is a further feature and advantage of the present invention to provide a device, method and system for securely removing or transferring the contents of an ATM/CAT, which includes emergency measures for an operator in case of emergency during transfer and removal of ATM/CAT contents.

It is a still further feature and advantage of the present invention to provide a device, method and system for securely removing or transferring the contents of an ATM/CAT, which enables orderly stacking items deposited within the ATM/CAT in order to facilitate orderly extraction of the items.

It is another feature and advantage of the present invention to provide a device, method and system for securely removing or transferring the contents of an ATM/CAT, which enables counting and tracking of items transferred or removed from the ATM/CAT.

It is still another feature and advantage of the present invention to provide a device, method and system for securely removing or transferring the contents of an ATM/CAT, which saves money in armored pickup costs, producing a significant commercial savings to financial institutions, such as banks, who operate the ATMs/CATs.

It is an additional feature and advantage of the present invention to provide a device, method and system for securely removing or transferring the contents of an ATM/CAT, which is usable with existing ATMs/CATs having either front or rear access via economical field retrofit.

It is still an additional feature and advantage of the present invention to provide a device, method and system for securely removing or transferring the contents of an ATM/CAT, which is implemented with minimal modification to the existing ATM/CAT.

It is another feature and advantage of the present invention to provide a device, method and system for securely removing or transferring the contents of an ATM/CAT, that is implemented without requiring data connection to the ATM/CAT.

It is still another features and advantage of the present invention to provide a device, method and system for securely removing or transferring the contents of an ATM/CAT, that enables secure retrieval of items from the depository retrieval mechanism, such as by use of a physical key, a wired electronic key, a smart card, a magnetic stripe card and PIN, an optical stripe, or wireless or other remote sensing device.

It is an additional feature and advantage of the present invention to provide a device, method and system for securely removing or transferring the contents of an ATM/CAT, which makes use, for example, of a secure access device, such as a transponder or other secure access device attachable to the deposit transfer bin.

It is another feature and advantage of the present invention to provide a device, method and system for securely removing or transferring the contents of an ATM/CAT, which utilizes, for example, a transponder or other secure access device for remote identification of the transfer bin for auditing and tracking.

It is a further feature and advantage of the present invention to provide a device, method and system for securely removing or transferring the contents of an ATM/CAT, which enables auditing of the number and value of the deposited items.

To achieve the stated and other features, advantages and objects, an embodiment of the present invention makes use of computer hardware and software applications to provide a method and system for extracting one or more deposited items from a secure enclosure, such as the envelope bin of a safe of an automated teller machine or customer access terminal (ATM/CAT). An embodiment of the present invention utilizes, for example, one or more secure access devices, a card device, one or more transponder devices, an input device, one or more control mechanisms, one or more transport mechanisms, such as a motor driven belt transport mechanism.

In an embodiment of the present invention, a service person enters a retrieval request at the ATM/CAT, which is received by a control device for the secure enclosure; the control device automatically opens an access port of the secure enclosure; and at least one deposited item is automatically transported from the secure enclosure through the opened access port.

An embodiment of the present invention includes, for example, a secure access device associated with the secure enclosure, which automatically verifies a retrieval access authorization for the service person. Verification of the retrieval access authorization for the service person includes, for example, automatically verifying the authorization with a card in a card device associated with the secure enclosure, such as with identification data stored on a magnetic stripe of the card.

In an embodiment of the present invention, verification of the retrieval access authorization for the service person also includes, for example, automatically verifying the service person's authorization with a transponder device associated with or disposed within the secure enclosure. Further, the transponder device includes, for example, a transponder tag in the custody of the service person or a transponder device of a secured container, such as a secured transfer bin.

An embodiment of the present invention includes, for example, an input device, such as a keypad or touchscreen device, which receives the retrieval request and automatically sends the request, for example, to the control device. In turn, the control device automatically activates a mechanism associated with the access port, and the control mechanism automatically opens a shutter associated with the access port of the secure enclosure, such as the envelope bin of the ATM/CAT safe.

In an embodiment of the present invention, one or more deposited items are automatically transported out of the secure enclosure through the opened access port, which is disposed on the front of the secure enclosure for a front access ATM/CAT or the rear of the secure enclosure for a rear access ATM/CAT. The one or more deposited items are automatically transported through the access port by a transport mechanism, such as a motor driven belt transport mechanism, which is automatically activated by the control device.

In an embodiment of the present invention, the one or more deposited items are automatically transported by the transport mechanism from a stack of deposited items in the secure enclosure. The stack of deposited items is automatically formed by receiving and guiding a plurality of deposited items into a stacking location within the secure enclosure, such as the envelope storage bin of the ATM/CAT safe. The plurality of deposited items are received through a front deposit entry slot of a front service ATM/CAT or a rear deposit entry slot of a rear service ATM/CAT into a depository mechanism associated with the secure enclosure.

In an embodiment of the present invention, the deposited item or items are automatically transported from the secure enclosure through the opened access port, for example, to be retrieved by a service person, or to be received, for example, in a container having, for example a protruding section docked with the access port. In the latter case, the deposited item or items are automatically guided through the protruding section, for example, into a stacking position within the container, such as the secured transfer bin.

In an embodiment of the present invention, the control device also automatically activates a control mechanism associated with the access port to close the access port by closing the shutter associated with the access port. Additionally, an embodiment of the present invention automatically tracks the deposited item or items, for example, by comparing data related to receipt of the deposited item or items in the secure enclosure with data relating to transporting the deposited item or items from the secure enclosure.

Additional objects, advantages and novel features of the invention will be set forth in part in the description which follows, and in part will become more apparent to those skilled in the art upon examination of the following, or may be learned by practice of the invention.

DETAILED DESCRIPTION referring now in detail to an embodiment of the invention, an example of which is illustrated in the accompanying drawings, an embodiment of the present invention provides a device, system, and method for removing materials from a secure enclosure, and particularly for extracting deposited items from an ATM/CAT, which allows items to be removed from the ATM/CAT safe without first opening the safe. For ATMs/CATs, it is normally required that customer-deposited items be removed daily. Since ATMs/CATs are by nature located in areas accessible to the public, it is desirable to be able to remove customer deposited items without actually opening the safe enclosure of the ATM/CAT, because doing so creates security problems, for example, for the safe contents, as well as for the service person.

An embodiment of the present invention provides a device, method, and system for extracting items from an enclosed safe, and in particular, from the enclosed safe of an ATM/CAT, as required for normal business. An embodiment of the present invention provides a solution to the security problems associated with presently available ATMs/CATs by allowing a regularly-scheduled service person or courier to obtain items from inside the safe of the ATM/CAT, without having access to the combination that is required to open the safe door of the ATM/CAT. Thus, in an embodiment of the present invention, it is never necessary for the courier or service person to open the safe door or to have the combination in his or her possession.

An embodiment of the present invention involves, for example, a modification to a standard ATM/CAT depositor bin located inside the safe and a mechanism to control the opening of a small access port in the safe door or rear panel of the ATM/CAT. In addition, an embodiment of the present invention includes a system to control the operation of these devices in order to allow the contents of the ATM/CAT safe to be obtained. In an embodiment of the present invention, the customer deposit slot, ergonomics, process, and mechanism are unchanged from the standard ATM/CAT item depository. Therefore, the effect of the features of such an embodiment remains transparent to customers who use the ATM/CAT.

An embodiment of the present invention also includes, for example, specialized adaptation of the typical deposit slot of an ATM/CAT to allow stacking and removal of deposited items through the retrieval slot and simplified retrofit of the ATM/CAT. In an embodiment of the present invention, use is also made, for example, of one or more docking devices, transport mechanisms and associated electronics, belts, motors, and control systems to provide secure access to the ATM/CAT by the service person, as well as one or more security measures to protect against theft or other emergency during transfer or removal of contents from the ATM/CAT.

Figure 1:
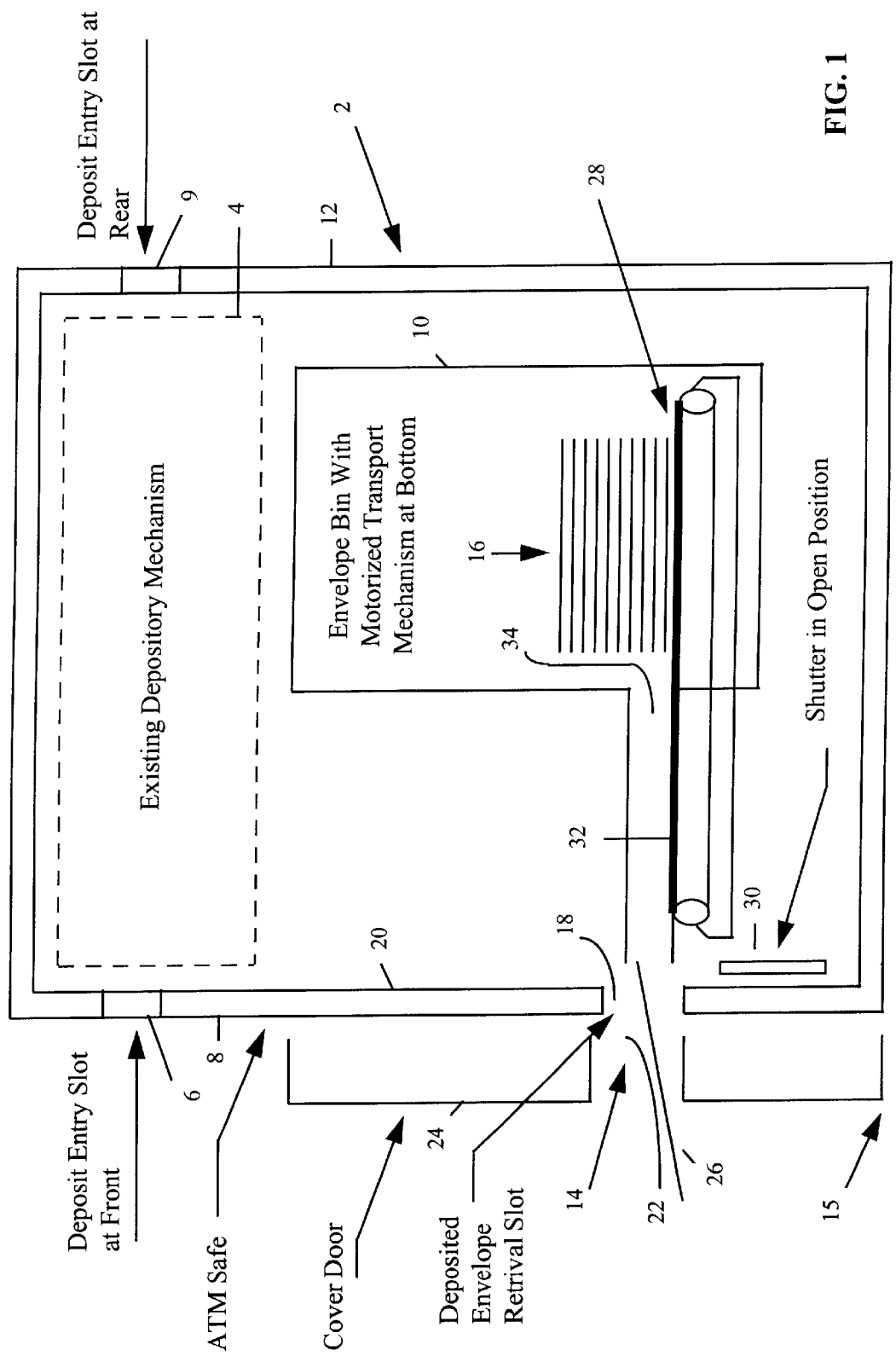
FIG. 1 is a schematic diagram which illustrates an example of an ATM/CAT modified with a deposited item retrieval slot and associated motorized transport mechanism for an embodiment of the present invention.

FIG. 1 is a somewhat schematic diagram which illustrates an example of an ATM/CAT modified with a deposited item retrieval slot and associated motorized transport mechanism for an embodiment of the present invention. Referring to FIG. 1, an ATM/CAT has an existing depository mechanism 4 associated with a depository slot 6 disposed, for example, on the front 8 of the ATM/CAT. The ATM/CAT may also have a rear depository slot 9 disposed, for example, on the rear 12 of the ATM/CAT, likewise associated with the depository mechanism 4. The ATM/CAT also has an envelope bin 10 associated with the depository mechanism 4.

Referring further to FIG. 1, in an embodiment of the present invention, for example, a new retrieval slot 14 is added to the ATM/CAT to facilitate item removal. The new retrieval slot 14 is added near the bottom 15 of the ATM/CAT safe 2 at the service side, which is the front side 8 for front access ATMs/CATs. The retrieval slot 14 is disposed, for example, a few inches above the floor, for motorized extraction of the contents 16 of the envelope bin 10, for example, into a transfer bin.

In an embodiment of the present invention, the retrieval slot 14 includes, for example, an opening 18 in the safe door 20, as well as an opening 22 in the sheet metal cover door 24 of the ATM/CAT safe 2. In an embodiment of the present invention, the opening 18 in the safe door 20, for example, is vertically offset from the opening 22 in the sheet metal cover door 24, in order to make fishing at the contents 16 of the ATM/CAT safe 2 by an unauthorized intruder more difficult.

In an embodiment of the present invention, an existing ATM/CAT is modified such that items deposited by a customer in the depository mechanism 4 through the entry slot 6 become stacked at 16 in the envelope bin 10 in an orderly fashion via gravity fall. Such stacking is accomplished, for example, by the design of a transport mechanism and envelope bin 10. The stacking feature includes, for example, guide vanes or a supplemental transport mechanism to control the deposited items all the way to the bottom of the envelope bin 10. An embodiment of the present invention thus includes modifications, for example, to two components of a standard ATM/CAT, namely, the deposited item storage bin 10, and the ATM/CAT safe 2 itself.

In the operation of an embodiment of the present invention, when a customer deposits an item, such as an envelope, the deposited item enters the ATM/CAT safe 2 in the normal manner, for example, via the existing entry slot 6 and depository mechanism 4. In an embodiment of the present invention, during an authorized removal of deposited items 16 by a service person, a deposited item 26 is automatically transported by a transport mechanism 28 from the deposited item storage area 16 of the envelope bin 10 in the safe 2 to a service person standing outside the safe. It is not necessary for the service person to open the ATM/CAT safe 2 to retrieve the deposited items 16. A service person tasked with retrieving the deposited items 16 from the safe 2, but not needing to replenish cash in the ATM/CAT cash cassettes, does not need to open the safe door 20 and does not need to know the combination of the safe door lock.

In an embodiment of the present invention a modified version of the ATM/CAT deposited item storage bin 10 includes, for example, a storage area where deposited items 16 are stored, a transport mechanism 28 located at the bottom of the area of the storage bin where the deposited items are stored, and a motor, sensors, and control electronics to activate the transport mechanism, causing the deposited items to move one or more at a time out of the storage area, and in the direction of the deposited item retrieval slot 14.

In an embodiment of the present invention, modifications of the ATM/CAT safe 2 include the deposited item retrieval slot 14 added to the front door 20, in the case of front-service ATMs/CATs, or to the rear wall 12, in the case of rear-service ATMs/CATs. Additionally, a shutter 30 inside the safe 2 is positioned over the deposited item retrieval slot 14, and is normally in a closed position, but openable as shown in FIG. 1 to permit retrieval of the deposited items 16.

Figure 2:
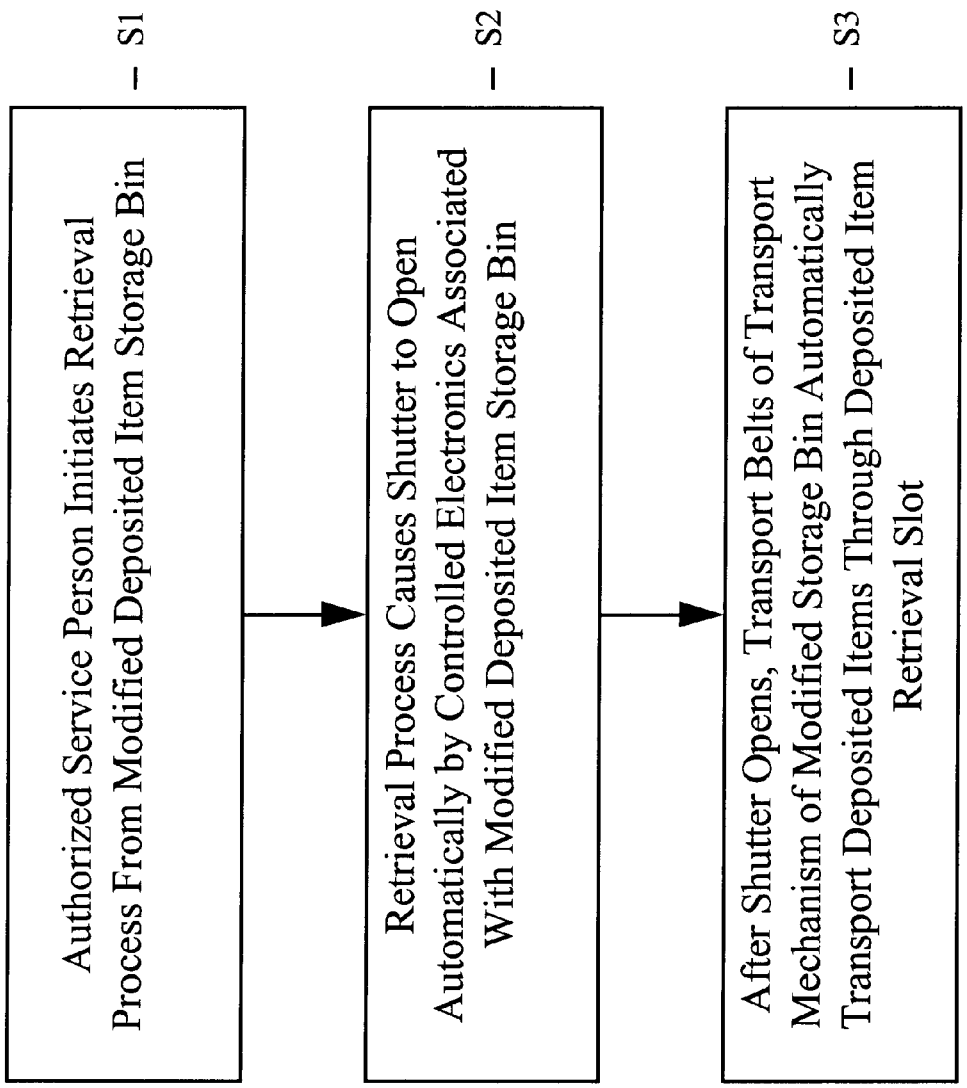
FIG. 2 is a flow chart which illustrates an example of the process of retrieval of deposited items from the modified ATM/CAT shown in FIG. 1 for an embodiment of the present invention.

FIG. 2 is a flow chart which illustrates an example of the process of retrieval of deposited items from the modified ATM/CAT shown in FIG. 1 for an embodiment of the present invention. Referring to FIG. 2, at S1, an authorized service person initiates the retrieval process from the modified deposited item storage bin 10 of the safe 2 of the modified ATM/CAT. At S2, the retrieval process causes the shutter 30 to open automatically by control electronics associated with the modified deposited item storage bin 10. After the shutter 30 opens, at S3, transport belts 32 of the transport mechanism 28 of the modified storage bin 10 automatically transport the deposited items 16, one at a time, through the deposited item retrieval slot 14.

Referring again to FIG. 1, as the transport belts 32 attempt to move the entire stack 16 of deposited items toward the deposited item retrieval slot 14, a specially added feature of a somewhat restricted exit opening 34 of the envelope bin 10 blocks the upper portion of the stack 16 from being transported. The lower portion of the stack 16 that is transported by the transport belts 32 through the exit opening 34 all the way through the retrieval slot 14 is thus limited to a predetermined height. In an embodiment of the present invention, generally, no more than two or three of the deposited items 16 are transported at once. As the deposited items exit the deposited item retrieval slot 14, a service person takes each exiting deposited item 26 out by hand.

Figure 3:
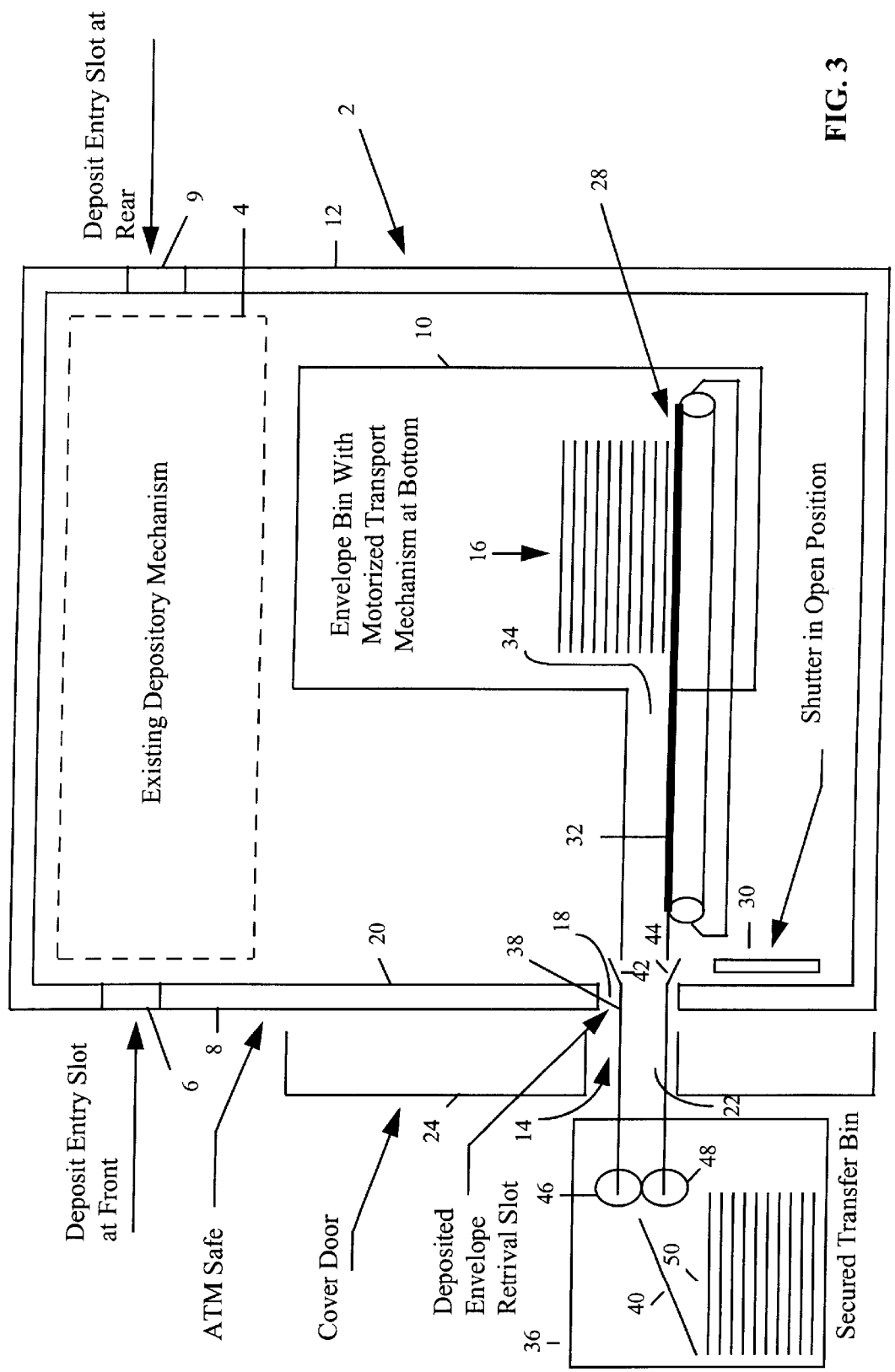
FIG. 3 is a schematic diagram which shows an example of the use of a secured transfer bin with the modified ATM/CAT of FIG. 1 for an embodiment of the present invention.

FIG. 3 is a somewhat schematic diagram which shows an example of the use of a secured transfer bin with the modified ATM/CAT of FIG. 1 for an embodiment of the present invention. Referring to FIG. 3, in an embodiment of the present invention, the transfer bin 36 is a box with a protruding section 38 to dock with the retrieval slot 14 of the modified ATM/CAT. The transfer bin 36 provides an automatic loading container for receiving retrieved deposited items 40. The container 36 fits in front of the deposited item retrieval slot 14, on the outside of the modified ATM/CAT. In an embodiment of the present invention, the protruding section 38 of the container 36 extends into the deposited item retrieval slot 14. The protruding section 38 of the container 36 includes guide surfaces 42, 44, which direct a retrieved deposited item 40 into the inside of the container 36.

Referring further to FIG. 3, in addition, rollers 46, 48 are provided inside the container 36 to transport a retrieved deposited item 40 into the container. The rollers 46, 48 are driven, for example, by a suitable gear assembly in the container 36, which is engagable, for example, with a corresponding gear assembly of the safe 2, disposed at a suitable location, such as just inside the deposited item retrieval slot 14. Thus, each retrieved deposited item 40 drops into the container 36 to form a neat stack 50 within the container.

Figure 4:
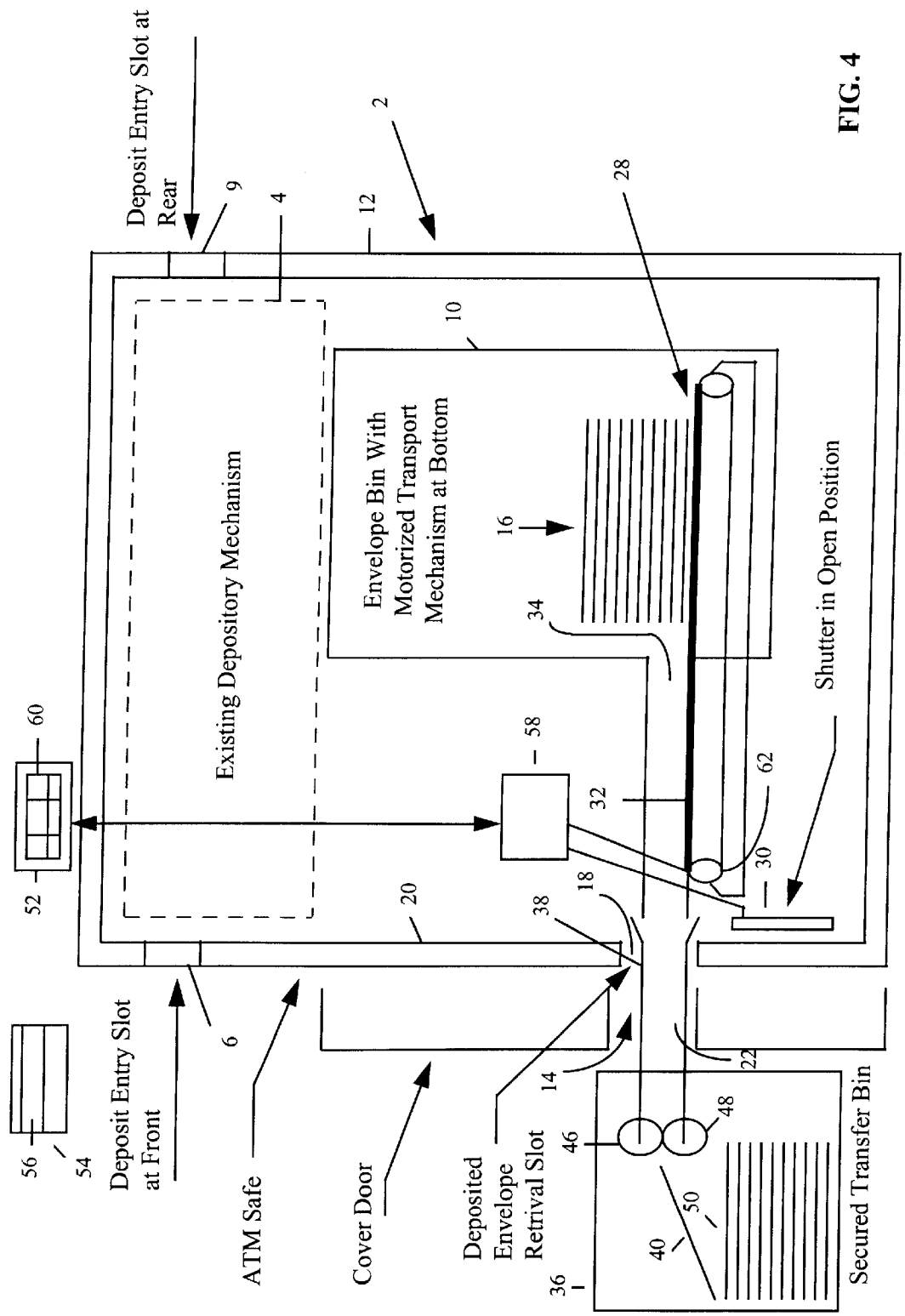
FIG. 4 is a schematic diagram which illustrates an example of key components and the flow of information between key components for the system and method of extracting and tracking the removal of deposited items from the modified ATM/CAT of FIGS. 1 and 3 for an embodiment of the present invention.

An embodiment of the present invention makes use of computer hardware and software in the system and method of extracting and tracking the removal of deposited items from the modified ATM/CAT. FIG. 4 is a somewhat schematic diagram which illustrates an example of key components and the flow of information between key components for the system and method of extracting and tracking the removal of deposited items from the modified ATM/CAT of FIGS. 1 and 3 for an embodiment of the present invention.

Referring to FIG. 4, in an embodiment of the present invention, the modified ATM/CAT is provided with a card device 52, which receives and authenticates a user with an authorized card 54 having identification data stored, for example, on a magnetic stripe 56 of the card. The card device 52 is coupled, for example, to a control device 58 of the modified ATM/CAT, which includes an ATM/CAT processor and which automatically controls opening and closing of the shutter 30 of the deposited items retrieval slot 14.

Referring further to FIG. 4, in an embodiment of the present invention, the control device is also coupled to a mechanism 62 which moves the transport belts 32. The modified ATM/CAT for an embodiment of the present invention is also provided with a keypad or touchscreen 60 associated, for example, with the card device 52 for receiving data in connection with deposits, as well as for receiving data in connection with the retrieval process.

Figure 5:
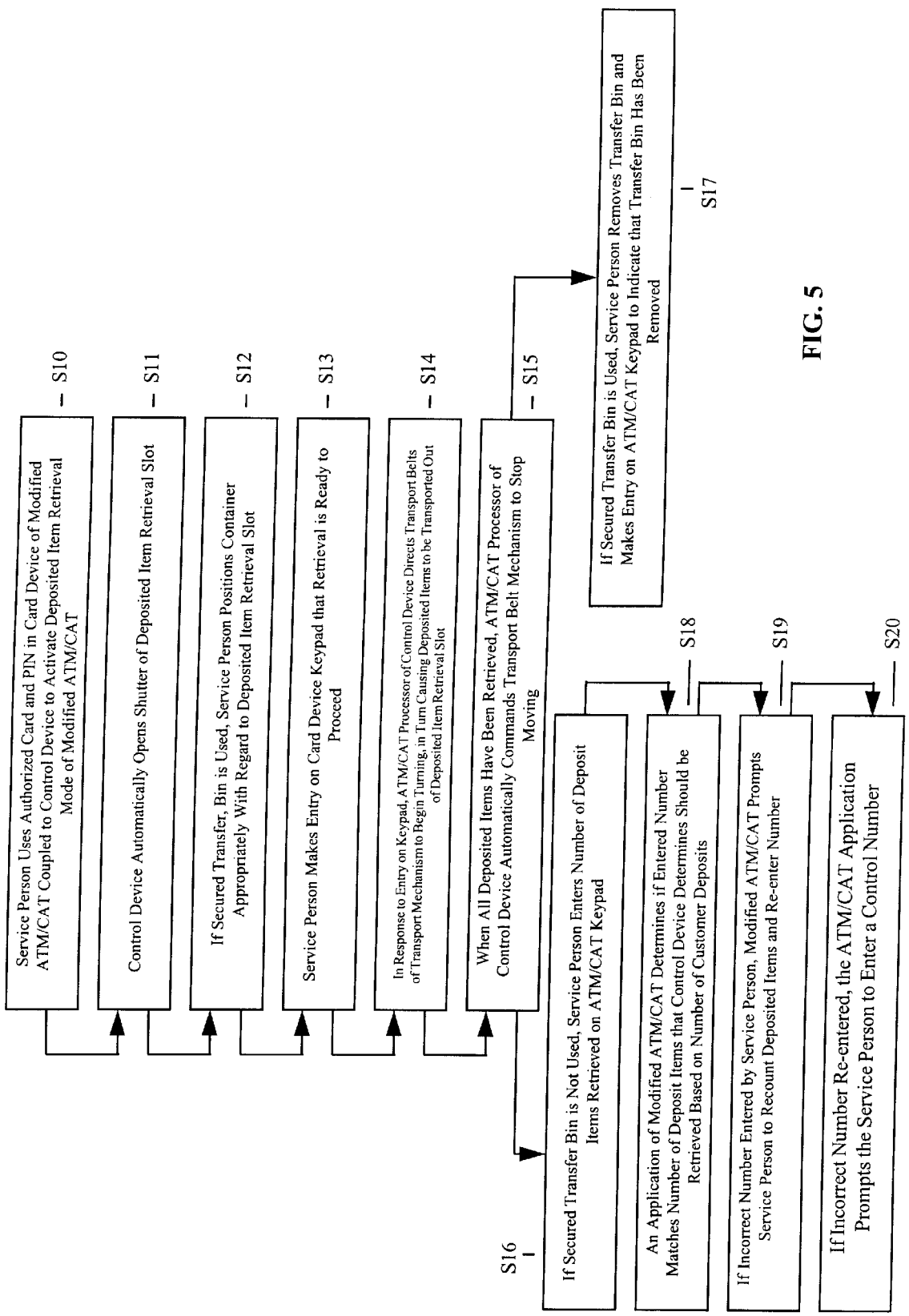
FIG. 5 is a flow chart which illustrates an example of the process of retrieval of deposited items from the modified ATM/CAT with the secured transfer bin for an embodiment of the present invention.

FIG. 5 is a flow chart which illustrates an example of the process of retrieval of deposited items from the modified ATM/CAT with the secured transfer bin for an embodiment of the present invention. Referring to FIG. 5, at S10, a service person uses, for example, an authorized card, such as card 54 with magnetic stripe 56, as well as a PIN, in card device 52 of the modified ATM/CAT, which is coupled to control device 58 of the modified ATM/CAT, to activate a deposited item retrieval mode of the modified ATM/CAT. In this mode, at S11, the control device 58 automatically opens the shutter 30 on the deposited item retrieval slot 14. At S12, if the secured transfer bin is used, the service person positions the container 36 appropriately with regard to the deposited item retrieval slot 14.

Referring further to FIG. 5, at S13, the service person then makes an entry on the keypad or touchscreen 60 associated with card device 52 of the modified ATM/CAT, indicating that retrieval is ready to proceed. At S14, in response to the entry on the keypad or touchscreen 54, the ATM/CAT processor of control device 58 directs the transport belt mechanism 62 to cause transport belts 32 to begin turning, in turn, causing deposited items 16 to be transported out the deposited item retrieval slot 14. If, for example, the secured transfer bin 36 is not available to the service person, each deposited item 40 is taken by hand by the service person, as it is presented at the deposited item retrieval slot 14, and no further action by the service person is required.

Referring again to FIG. 5, when all the deposited items 16 in the deposited item storage area 10 in the ATM/CAT safe 2 have been retrieved, at S15, the ATM/CAT processor of control device 58 automatically commands the transport belt mechanism 62 to stop moving. If the secured transfer bin 36 is not used, at S16, the service person enters the number of deposited items retrieved on the ATM/CAT keypad or touchscreen 60. If the transfer bin 36 is used, at S17, the service person removes the transfer bin from the retrieval slot 14 and makes an entry on the ATM/CAT keypad or touchscreen 60 to indicate that the transfer bin has been removed.

An embodiment of the present invention includes additional features which enhance the security of the deposited item retrieval process in the case where, for example, the transfer bin 32 is not used. For example, the modified ATM/CAT includes computer hardware and software which tracks the number of items deposited in the ATM/CAT safe 2, as well as the number of deposited items retrieved from the ATM/CAT safe.

Referring further to FIG. 5, when the service person enters the number of retrieved deposited items on the ATM/CAT keypad or touchscreen 60, at S18, an application of the modified ATM/CAT determines if this number matches the number of deposited items that the ATM/CAT processor associated, for example, with control device 58 determines should be retrieved, based on the number of customer deposits made since the last time the ATM/CAT safe 2 had deposited items retrieved from it.

An embodiment of the present invention also makes use of an existing ATM/CAT record printer associated, for example, with the card device 52. For example, the ATM/CAT record printer prints two records of a ATM/CAT ID, a courier ID, the number of deposited items extracted, the total batch value (which is the aggregate of all customers' declared deposits). The courier or service person places one copy of the record in the transfer bag or bin 36 and retains the other copy.

Referring again to FIG. 5, in an embodiment of the present invention, if the service person enters the incorrect number of deposited items, at S19, the application of the modified ATM/CAT prompts the service person to re-count the deposited items and re-enter the number. If the service person continues to enter the incorrect number of deposited items, at S20, the application prompts the service person to enter a control number printed, for example, on the outside of each deposited item. This process helps the service person establish a correct count.

Figure 6:
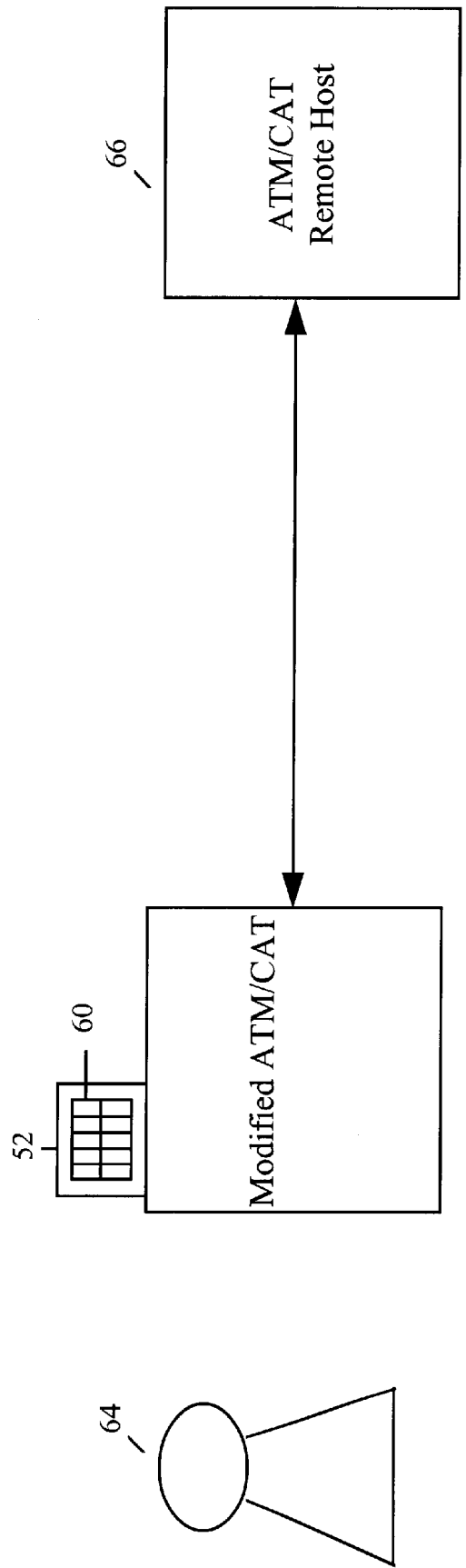
FIG. 6 is a schematic diagram which illustrates key components and the flow of information between key components for an example of the silent alarm aspect of the modified ATM/CAT for an embodiment of the present invention.

Another security enhancing feature for an embodiment of the present invention is a silent alarm functionality of the modified ATM/CAT. FIG. 6 is a flow chart which illustrates key components and the flow of information between key components for an example of the silent alarm aspect of the modified ATM/CAT for an embodiment of the present invention. Referring to FIG. 6, the silent alarm functionality provides the service person 64 an option to activate a silent alarm condition to notify the ATM/CAT remote host computer 66 coupled to the modified ATM/CAT of an emergency situation in cases in which the service person suspects that he or she is about to be physically threatened. The silent alarm condition is activated, for example, using the modified ATM/CAT keyboard or touchpad 60, and the person posing a threat to the service person assumes that the service person 64 is entering routine data or instructions.

As shown in FIGS. 1 and 3, an embodiment of the present invention includes modified ATM/CAT configurations in which service access is provided by a retrieval slot 14 at the front 8 of the modified ATM/CAT. An embodiment of the present invention can likewise provides service access by a retrieval slot at the rear 12 of the modified ATM/CAT. Front access is accomplished simply by locating the deposited item retrieval slot 14 at the front 8 of front-service ATMs/CATs, in which the deposit entry slot 6 is on the front of the ATM/CAT. Rear access is likewise accomplished by locating the deposited item retrieval slot 14 at the rear 12 of rear-service ATMs/CATs, in which the deposit entry slot 9 is on the rear of the ATM/CAT. In either case, an embodiment of the present invention includes a deposit mechanism 4 designed to transport and stack the deposited items 16 in a more orderly fashion than achieved by presently available gravity bins. This orderly stacking of deposited items 16 is accomplished, for example, by a plurality of discrete slots defined by a number of vanes disposed in the deposit bin 10.

In an alternate embodiment of the present invention, the depository mechanism 4 can be modified in order for a service person to retrieve customer deposited items from either the front entry slot 6 or the rear entry slot 10. Thus, when a courier arrives for deposit pickup, the modified depository mechanism 4 sequentially retrieves each stacked deposited item 16 and reverses it out the same transport and the same slot of ATM/CAT safe 2 as was used by customers for deposit, into a waiting transfer bag or cassette. As with the previous embodiments, appropriate security gates are usable in conjunction with this embodiment, including an access card 54 and PIN number.

Advantages of such an alternate embodiment include, for example, no additional access slot, such as access slot 14, for the safe 2 is needed, thus avoiding possible additional and costly UL291 requirements, which allows a less expensive field retrofit. Additionally, such an alternate embodiment provides better ergonomics for the courier or service person, because of the use of the customer deposit slot 6 or 9 the depository retrieval slot, instead of slot 14 disposed at foot level 15. Another advantage of such an alternate embodiment is that no additional slot 22 and shutter 30 are needed at the front of the modified ATM/CAT, which could tip off prospective criminals, and the external appearance of the modified ATM/CAT is identical to standard depositors.

Further, such an alternate embodiment is much easier to field retrofit and may include replacement of the entire depository mechanism and envelope bin, which is an acceptable field operation. In addition, such an alternate embodiment leverages transport and sensor mechanisms already required in standard depositors. Such an alternate embodiment includes a number of optional aspects, such as discrete stacking and pick mechanisms, a docking and captivation provision designed into the depositor slot and bezel, which allows mating with the transfer bag or bin 36, and features for single deposited item retrieval, counting the deposited items and auditing, and ensuring that all deposited items are extracted.

An embodiment of the present invention also makes use of a secure system, such as by transponder and interrogator device, for access and tracking of extracted deposited items, installation of the system without use of a data connection to the existing ATM/CAT, and installation with minimal modification to the existing ATM/CAT. An embodiment of the present invention is configurable with ATMs/CATs having either front or rear access, in some variations requires little or no modification to the existing ATM/CAT, and requires no data connection to the ATM/CAT. An embodiment of the present invention allows this operation using economic field retrofit to existing ATMs/CATs.

Figure 7:
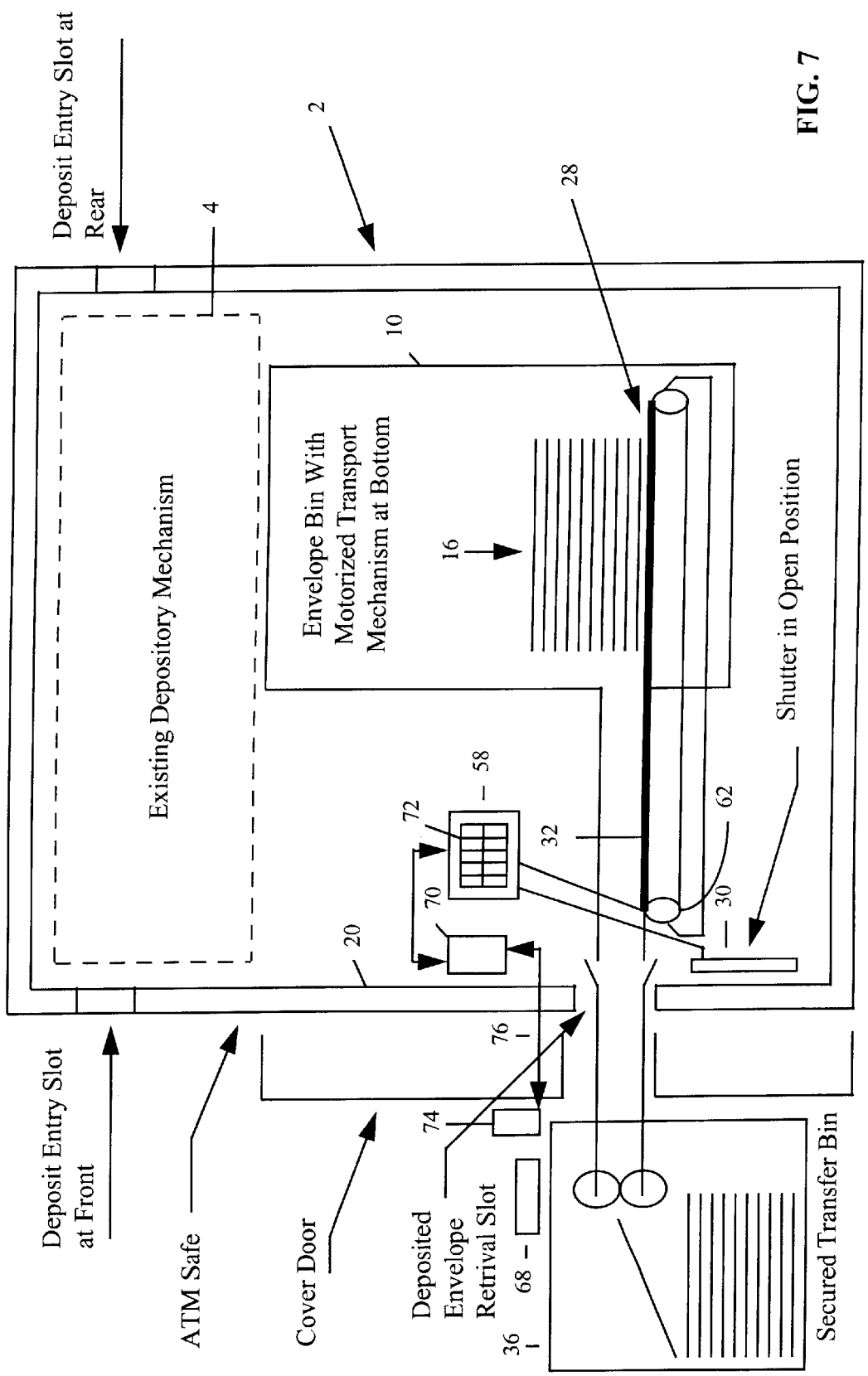
FIG. 7 is a schematic diagram which shows an example of the modified ATM/CAT of FIGS. 1, 3, and 4 with a transponder and interrogator device for an embodiment of the present invention.

FIG. 7 is a somewhat schematic diagram which shows an example of the modified ATM/CAT of FIGS. 1, 3, and 4 with a transponder and interrogation device for an embodiment of the present invention. Referring to FIG. 7, an embodiment of the present invention includes use of a transponder or other secure access device 68 for accessing, for example, the deposit retrieval mechanism 62. In an embodiment of the present invention, the transponder or other secure access device 68 is attached to the deposit transfer bin 36. The transponder or other secure access device 68 of such alternate embodiment is usable for remote identification of the transfer bin 36 for auditing and tracking. The method and system of the present invention verifies that deposited items 16 have been retrieved from the ATM/CAT safe 2 and therefore provides for auditing the number and value of deposited items.

Referring to FIGS. 1, 3, 4, and 7, an embodiment of the present invention includes generally two primary components, and a number of additional features may be added to these primary components. The primary components include, for example, a safe portion installable in the ATM/CAT that allows mechanized feeding of deposited items 16 from a slot 14 in the modified ATM/CAT, referred to as the deposit retrieval mechanism 28. The primary components also include, for example, a deposit transfer bin 36, which is external to and usable in connection with the deposit retrieval mechanism 28. The deposit transfer bin 36 is used to retrieve deposited items 16 for transport, for example, to a bank or other central location by a courier or service person.

A feature of an embodiment of the present invention is that an economical field retrofit can be made to existing ATMs/CATs. In such an embodiment, the existing deposit bin is removed and replaced by the mechanized bin 10, and the safe door is replaced with the same type of door 20, but with an extra slot 14 provided in the door. In addition, no connections into the controller for the ATM/CAT or the ATM/CAT data system are required with such embodiment.

Referring to FIG. 7, an embodiment of the present invention includes use of a transponder or other secure access device 68 for securely retrieving items from the depository retrieval mechanism 28. In one embodiment, the transponder device 68 is clipped or otherwise attached to the transfer bin 36 that is carried and used by a courier or service person. When the transponder device 68 is in proximity to a receiver or a transponder 70 inside the ATM/CAT safe 2, then the depository retrieval mechanism 28 is activated. Upon activation, the security shutter 28 opens and the retrieval mechanism 26 is enabled for removing deposits 22.

In an embodiment of the present invention, use of such wireless security eliminates the need for the user to perform such security tasks as entering a password or presenting an identification card to the modified ATM/CAT in a service mode for authorization to initiate the retrieval of deposited documents 16. With regard to the secure access device, such as the transponder 68, passive access devices, such as those having a molded plastic case, are typically used for building access or as security badges. These systems typically are used in conjunction with activating solenoid-controlled locks for doors of buildings.

In an embodiment of the present invention, the application of the security system includes, for example, a main control unit 58 mounted at or near the interior wall of the modified ATM/CAT near the door 20 being controlled. The security system can be programmed, for example, by keypad 72 on the main control unit 58. The application of the security system also includes, for example, a remote unit 74 mounted on the other side of the door 20 of the ATM/CAT safe 2. The remote unit 74 is connected, for example, by a cable 76 to the main control unit 58.

Additionally, in an alternate embodiment of the present invention, the application of the security system includes, for example, a transponder tag maintained, for example, by the courier or service person on a key chain, instead of transponder 68 on the transfer bin 36. In order to unlock the door 20, the courier or service person holds the tag within a few inches of the remote unit 74 in a manner similar to use of transponder 68 on transfer bin 36. Thus, an embodiment of the present invention provides a unique application of the wireless security system in conjunction with modified ATM/CAT that is configured with the retrievable-item depository retrieval device 28. In an embodiment of the present invention, the transponder tag 68 is fixed to the deposit transfer bin 36, instead of on the authorized person's key ring. In such embodiment, the remote unit 74 is installed in the ATM/CAT safe 2 in close proximity to the document retrieval slot 14 in the safe.

Figure 8:
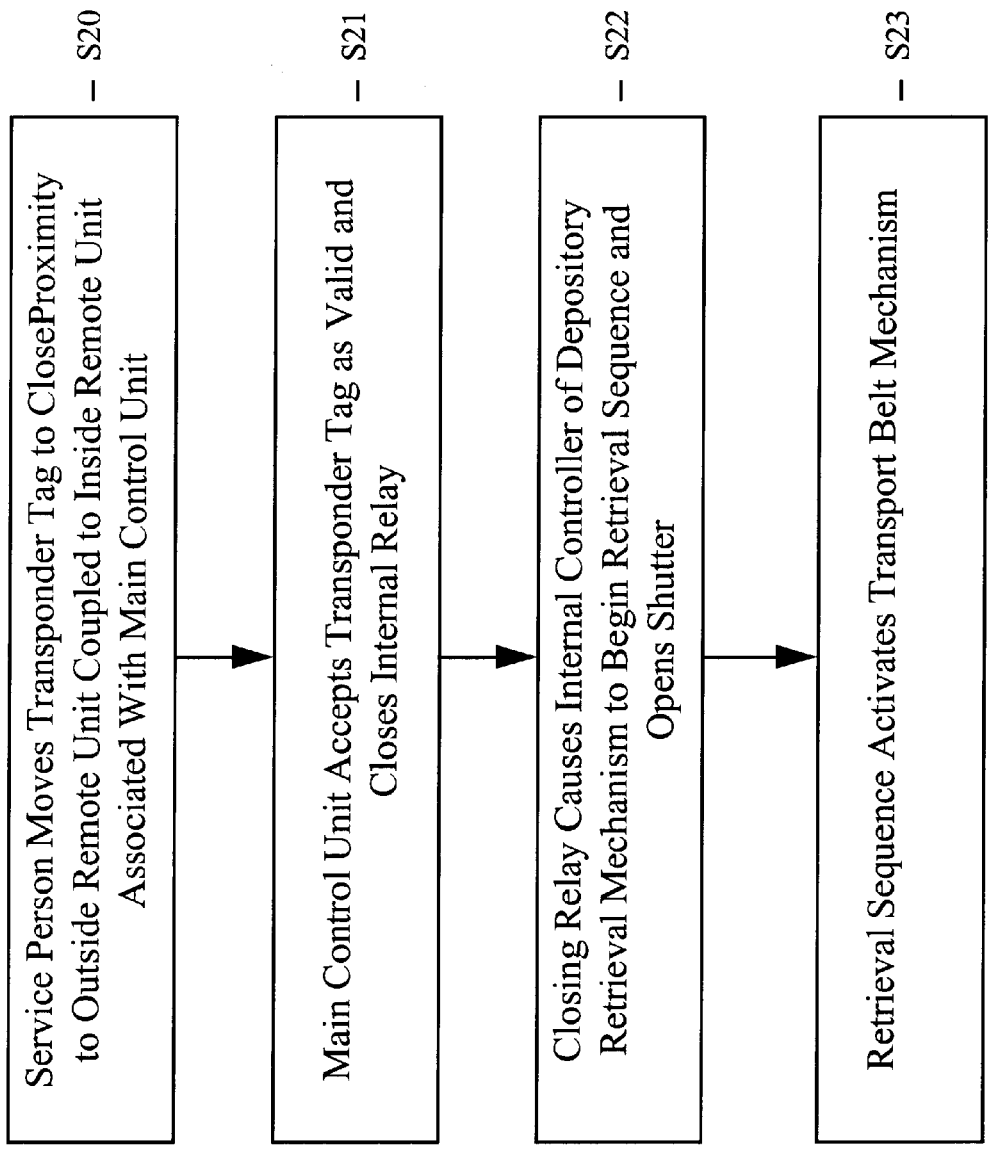
FIG. 8 is a flow chart which illustrates an example of the process of retrieval of deposited items using the secure access device with the modified ATM/CAT for an embodiment of the present invention.

FIG. 8 is a flow chart which illustrates an example of the process of retrieval of deposited items using the secure access device with the modified ATM/CAT for an embodiment of the present invention. Referring to FIG. 8, at S20, a courier or service person moves the tag 68 into close proximity to the outside remote unit 74 coupled to inside remote unit 70 associated with the main control unit 58. At S21, the main control unit 58 accepts the tag 68 as valid. Upon acceptance of the tag 68 as valid by the main control unit 58, the main control unit closes an internal relay. At S22, closing of the relay, in turn, causes an internal controller of the depository retrieval mechanism 28 to begin a sequence that includes opening of the shutter 30 and performing other functions required to retrieve deposited items, such as activation of transport belt mechanism 62 at S23.

An advantage provided by use of the transponder devices or other electronic security device 68 for an embodiment of the present invention is that such devices provide an audit trail of access locations and dates and times by the courier or service person. For example, in an embodiment of the present invention in which the transponder 68 is attached to the deposit transfer bin 36, a record of the location and use of each depository transfer bin can be maintained. Thus, the transfer of the bin 36, for example, to a truck, and through any other transportation system, and eventually to a processing center, can be tracked and an audit trail maintained. Further, the self-contained deposit retrieval system for an embodiment of the present invention does not require a data connection to the ATM/CAT computer system.

An embodiment of the present invention includes a logistical system and sensors, which can make use, for example, of some aspects of the existing ATM/CAT, for counting the number of deposits since the last transfer and the accumulated or claimed dollar value of the deposited items. Upon deposit removal or retrieval, the number of items extracted by the retrieval mechanism is determined, and this information is either presented or retained.

In another aspect for an embodiment of the present invention, the deposit transfer bin 36 further includes, for example, an attached bag of flexible material, such as canvas or nylon material, for accumulating deposited envelopes or other items retrieved from the ATM/CAT safe 2. Upon completion of extraction of the envelopes, the deposit transfer bin 36 is separated from the flexible bag using a key lock. In such an aspect of an embodiment of the present invention a cover plate can be installed that separates the deposit transfer bin 36 from the flexible bag. The assembly of the flexible bag and the cover plate are separated from the transfer bin 36, and the flexible bag alone is used to transfer the deposit contents, after retrieval of deposited items.

Such an aspect of an embodiment of the present invention thus allows the deposit transfer bin 36 to be used at any number of modified ATMs/CATs and allows the contents of each modified ATM/CAT to be segregated from the contents of other modified ATMs/CATs, for example, while the contents are transported to a processing center. The flexible bag and transfer bin 36 are used, for example, in conjunction with electronic sensors or other devices for tamper indication, which indicate, for example, whether or not the correct procedure was followed in removing the flexible bag and sealing it from the transfer bin.

Various preferred embodiments of the invention have been described in fulfillment of the various objects of the invention. It will be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method for extracting at least one deposited item from a secure enclosure, comprising:

receiving a plurality of deposited items consisting at least in part of items enclosed in envelopes from a plurality of customers through a deposit entry slot associated with a depository mechanism of the secure enclosure;

receiving a retrieval request from an authorized service person by a control device for the secure enclosure operable only by the authorized service person;

automatically opening an access port of the secure enclosure by the control device in response to the retrieval request; and automatically transporting at least one deposited item from the secure enclosure through the opened access port to the authorized service person.

2. The method of claim 1, wherein the secure enclosure further comprises a safe of an automated teller machine.

3. The method of claim 2, wherein the secure enclosure further comprises an envelope bin of the automated teller machine safe.

4. The method of claim 1, wherein receiving the retrieval request further comprises verifying a retrieval access authorization for the service person by a secure access device associated with the secure enclosure.

5. The method of claim 4, wherein verifying the retrieval access authorization by the secure access device further comprises verifying the authorization with a card in a card device associated with the secure enclosure.

6. The method of claim 5, wherein verifying the authorization with the card in the card device further comprises automatically verifying the authorization with identification data stored on a magnetic stripe of the card.

7. The method of claim 4, wherein verifying the retrieval access authorization by the secure access device further comprises automatically verifying the authorization with a transponder device associated with the secure enclosure.

8. The method of claim 7, wherein verifying the authorization with the transponder device further comprises automatically verifying the authorization with the transponder device of a transponder tag.

9. The method of claim 8, wherein verifying the authorization with the transponder device further comprises automatically verifying the authorization with the transponder device of a secured transfer bin.

10. The method of claim 1, wherein receiving the retrieval request further comprises receiving the retrieval request at an input device associated with the secure enclosure.

11. The method of claim 10, wherein receiving the retrieval request further comprises automatically sending the request by the input device to the control device.

12. The method of claim 11, wherein the input device further comprises one of a keypad and a touch screen.

13. The method of claim 12, wherein automatically opening the access port further comprises automatically activating a control mechanism associated with the access port by the control device.

14. The method of claim 13, wherein automatically activating the control mechanism further comprises automatically opening a shutter associated with the access port by the control mechanism.

15. The method of claim 14, wherein the secure enclosure further comprises a safe of an automated teller machine.

16. The method of claim 15, wherein the secure enclosure further comprises an envelope bin of the automated teller machine safe.

17. The method of claim 1, wherein automatically transporting the deposited item through the access port further comprises automatically transporting the deposited item through one of a front access port of the secure enclosure and a rear access port of the secure enclosure.

18. The method of claim 1, wherein automatically transporting the deposited item through the access port further comprises automatically transporting the deposited item by a transport mechanism.

19. The method of claim 18, wherein automatically transporting the deposited item by the transport mechanism further comprises automatically activating the transport mechanism by the control device.

20. The method of claim 19, wherein automatically activating the transport mechanism further comprises automatically activating a motor driven belt transport mechanism by the control device.

21. The method of claim 20, wherein the secure enclosure further comprises a safe of an automated teller machine.

22. The method of claim 21, wherein the secure enclosure further comprises an envelope bin of the automated teller machine safe.

23. The method of claim 1, wherein automatically transporting the deposited item from the secure enclosure further comprises automatically transporting the deposited item from a stack of deposited items in the secure enclosure.

24. The method of claim 23, wherein automatically transporting the deposited item from the stack of deposited items further comprises automatically forming the stack of deposited items.

25. The method of claim 24, wherein automatically forming the stack of deposited items further comprises receiving a plurality of deposited items in the secure enclosure.

26. The method of claim 25, wherein automatically forming the stack of deposited items further comprises guiding the plurality of deposited items to a stacking location in the secure enclosure.

27. The method of claim 26, wherein the secure enclosure further comprises a safe of an automated teller machine.

28. The method of claim 27, wherein the secure enclosure further comprises an envelope bin of the automated teller machine safe.

29. The method of claim 1, wherein receiving the plurality of deposited items further comprises receiving the plurality of deposited items through one of a front deposit entry slot associated with the depository mechanism and a rear deposit entry slot associated with the depository mechanism.

30. The method of claim 29, wherein the secure enclosure further comprises a safe of an automated teller machine.

31. The method of claim 30, wherein the secure enclosure further comprises an envelope bin of the automated teller machine safe.

32. The method of claim 1, wherein automatically transporting the deposited item from the secure enclosure further comprises automatically transporting the deposited item through the opened access port to a service person.

33. The method of claim 1, wherein automatically transporting the deposited item from the secure enclosure further comprises automatically transporting the deposited item through the opened access port into a container in the possession of the authorized service person.

34. The method of claim 33, wherein, automatically transporting the deposited item through the access port into the container further comprises docking a protruding section of the container with the access port.

35. The method of claim 34, wherein automatically transporting the deposited item through the access port into the container further comprises automatically guiding the deposited item through the protruding section into the container.

36. The method of claim 35, wherein automatically guiding the deposited item further comprises automatically guiding the deposited item to a stacking position within the container.

37. The method of claim 36, wherein the container further comprises a secured transfer bin.

38. The method of claim 1, further comprising automatically closing the access port.

39. The method of claim 38, wherein automatically closing the access port further comprises automatically closing the access port by a control mechanism associated with the access port.

40. The method of claim 39, wherein automatically closing the access port by the control mechanism further comprises automatically closing a shutter associated with the access port by the control mechanism.

41. The method of claim 1, further comprising automatically tracking the deposited item.

42. The method of claim 41, wherein automatically tracking the deposited item further comprises automatically comparing data related to receipt of the deposited item in the secure enclosure with data relating to transporting the deposited from the secure enclosure.

43. A system for extracting at least one deposited item from a secure enclosure, comprising:
a deposit entry slot associated with a depository mechanism of the secure enclosure for receiving a plurality of deposited items consisting at least in part of items enclosed in envelopes from a plurality of customers;
a control device for the secure enclosure for receiving a retrieval request from an authorized service person;
wherein the control device is adapted for automatically opening an access port of the secure enclosure in response to the retrieval request; and
a transport mechanism for automatically transporting at least one deposited item from the secure enclosure through the opened access port to the authorized service person.

44. The system of claim 43, wherein the control device further comprises a secure access device associated with the secure enclosure for verifying a retrieval access authorization.

45. The system of claim 44, wherein the secure access device further comprises a card device associated with the secure enclosure.

46. The system of claim 44, wherein the secure access device further comprises a transponder device associated with the secure enclosure.

47. The system of claim 44, wherein the secure enclosure further comprises a safe of an automated teller machine.

48. The system of claim 43, wherein the control device further comprises an input device associated with the secure enclosure.

49. The system of claim 48, wherein the input device further comprises one of a keypad and a touch screen.

50. The system of claim 48, wherein the control device further comprises a control mechanism of the access port coupled to the control device.

51. The system of claim 50, wherein the secure enclosure further comprises a safe of an automated teller machine.

52. The system of claim 48, wherein the transport mechanism further comprises a motor driven belt transport mechanism.

53. The system of claim 52, wherein the secure enclosure further comprises a safe of an automated teller machine.

54. The system of claim 48, wherein the transport mechanism further comprises means for receiving the transported item.

55. The system of claim 54, wherein the means for receiving the transported item further comprises a secured transfer bin.

56. A system for extracting at least one deposited item from a secure enclosure, comprising:

a depository mechanism for receiving a plurality of deposited items from a plurality of customers through a deposit entry slot of the secure enclosure associated with the depository mechanism;

a control device for the secure enclosure for receiving a retrieval request from a service person, the control device being inoperable by the customers;

an access port of the secure enclosure spaced apart from the deposit entry slot, and the control device being adapted for automatically opening the access port in response to the retrieval request; and a transport mechanism for automatically transporting at least one deposited item from the secure enclosure through the opened access port to the service person.

* * * * *